Dec. 24, 1968     J. M. HANNAN     3,417,985
AUTOMATIC ANTISWAY MECHANISM FOR VEHICLES
Filed April 16, 1965     3 Sheets-Sheet 1
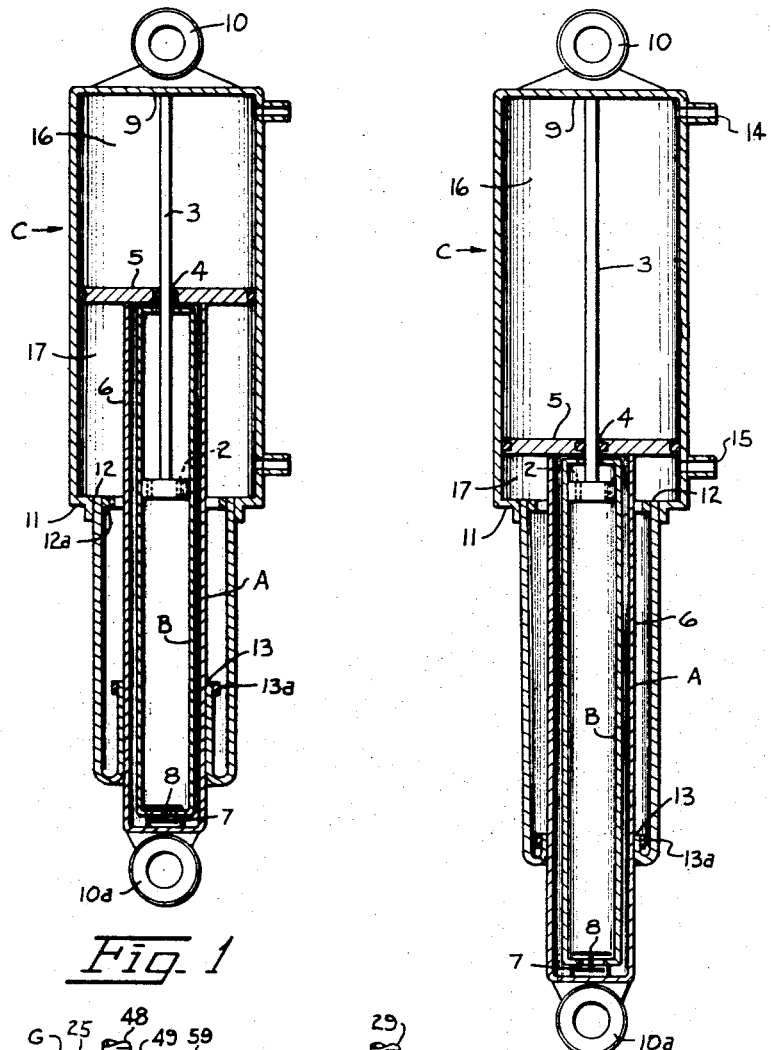
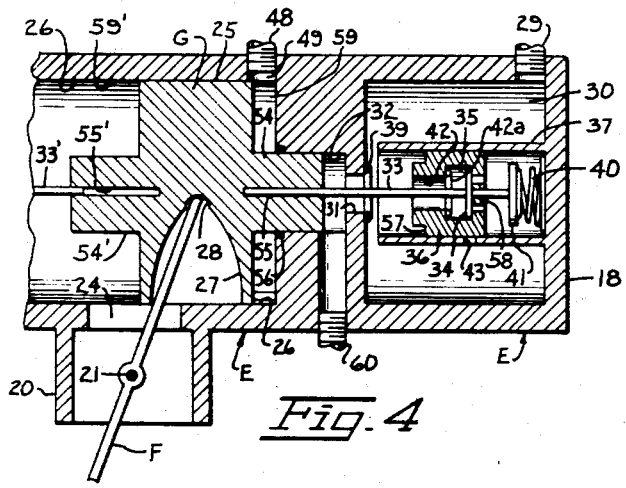
INVENTOR.
JERRY M. HANNAN
BY
William R. Piper
ATTORNEY INVENTOR.
JERRY M. HANNAN
BY William R. Piper
ATTORNEY Dec. 24, 1968 J. M. HANNAN 3,417,985
AUTOMATIC ANTISWAY MECHANISM FOR VEHICLES
Filed April 15, 1965 3 Sheets-Sheet 3

INVENTOR.
JERRY M. HANNAN
BY William R. Piper
ATTORNEY

United States Patent Office 3,417,985
Patented Dec. 24, 1968

3,417,985
AUTOMATIC ANTISWAY MECHANISM FOR VEHICLES
Jerry M. Hannan, 476 18th Ave.,
San Francisco, Calif. 94121
Filed Apr. 16, 1965, Ser. No. 448,602
5 Claims. (Cl. 267—11)

ABSTRACT OF THE DISCLOSURE

The automatic sway mechanism can be applied to a vehicle and it will cause the vehicle body to be banked laterally in the right direction and at the proper angle when the vehicle takes a curve. This will shift the center of gravity of both the vehicle body and passengers and overcome any tendency for any lateral movement of the passengers in the vehicle.

---

An object of my invention is to provide an automatic antisway mechanism for vehicles that is an improvement over the mechanism disclosed in my copending application on an Adjustable Shock Absorber and Automatic Control Mechanism Therefor, Ser. No. 393,024, filed Aug. 31, 1964, now abandoned. In the copending case I disclose a hydraulic shock absorber with an automatic mechanism for altering the effective lengths of the shock absorbers as the vehicle to which they are attached makes a right or left hand turn.

I made use of a conventional shock absorber and added a two-way air cylinder to it for increasing or decreasing the effective length of the shock absorber. I mounted one or more of these shock absorbers on each side of a vehicle. The arrangement is such that the vehicle body will be banked laterally in the right direction for the curve the vehicle is taking and the vehicle body will be banked at the proper angle for the curve.

It is well known that if the vehicle body is not banked when the vehicle is making a turn, the tendency of the persons in the vehicle is to move laterally due to centrifugal force. If the vehicle body is properly and automatically banked when the vehicle is making a turn, then the center of gravity of both the vehicle body and the passengers in the vehicle will be shifted so there will be no tendency for a lateral movement of the person or persons in the vehicle. In my copending application I provide an electrical control for the automatic vehicle banking mechanism.

In the present improved mechanism, I provide an automatic mechanical control for properly banking the vehicle when taking turns. This mechanical control includes a pendulum that is free to swing laterally as the vehicle makes a turn. The pendulum actuates valves when it swings and compressed air is directed to the two-way air cylinders of the shock absorbers for elongating those on one side of the vehicle and shortening those on the other side as the vehicle makes the turn so that the vehicle body will be banked laterally in the right direction for the curve and at the proper angle. The driver can shut off the automatic control if he so desires.

The automatic mechanical control is simple in construction and is durable and efficient for the purpose intended. It is operated by centrifugal force which becomes effective when the vehicle is making a right or a left hand turn.

In a modified form of my invention I show adjustable means for maintaining a predetermined air pressure in the upper compartments of the air cylinders for buoyantly supporting heavier loads that are carried by the vehicle. A shuttle valve is associated with each upper air compartment and will permit the vehicle banking mechanism to operate automatically as the vehicle moves and makes a right or a left hand turn and this will not interfere with the adding of air to the upper compartments of the air cylinders should it be desirable for the vehicle to support a heavier load. It is possible to have the upper air compartments for the rear shock absorbes of the vehicle povided with the shuttle valves because the extra load is usually placed at the back of the vehicle.

A further modified form of my invention shows the double acting air cylinder separated from the shock absober but the two being connected to the same two relatively moving parts of the vehicle. It is possible to have as many double acting air cylinders as there are shock absorbers. Each double acting air cylinder is preferably disposed close to its associated shock absorber. It is possible to use only the upper air compartment for elongating the effective length of the shock absorber and do away with the lower air compartment and make use of gravity for shortening the effective shock absorber length. This will be explained more in detail later.

Other objects and advantages will appear as the specification continues. The novel features of the invention will be set forth in the appended claims.

Drawings

For a better understanding of my invention, reference should be made to the accompanying drawings, forming part of this specification, in which:

FIGURE 1 is a vertical section through a hydraulic shock absorber and shows my two-way control air cylinder operatively applied thereto. The parts are shown in normal position.

FIGURE 2 is a vertical section similar to FIGURE 1, but shows the air cylinder increasing the overall effective length of the hydraulic shock absorber.

FIGURE 4 shows a portion of the automatic pendulum-actuated control valve with the pendulum swung from a neutral position by centrifugal force caused by the moving vehicle making a turn.

Figure 6:
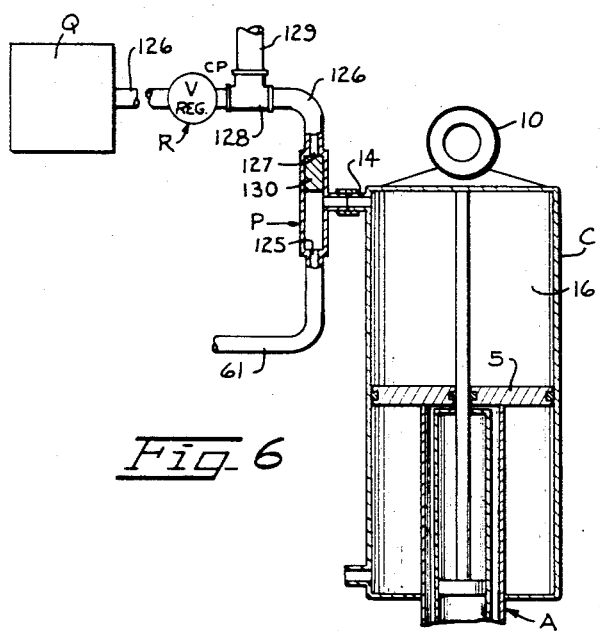

FIGURE 6 is a schematic showing of a modified form of double acting air cylinder wherein the upper air compartment is also connected to an auxiliary source of compressed air by means of a shuttle valve. This will permit additional air to be delivered to the upper air compartment for supporting a heavier vehicle load while still not interfering with the automatic mechanical control for properly banking the vehicle when taking turns to the right or to the left.

Figure 7:
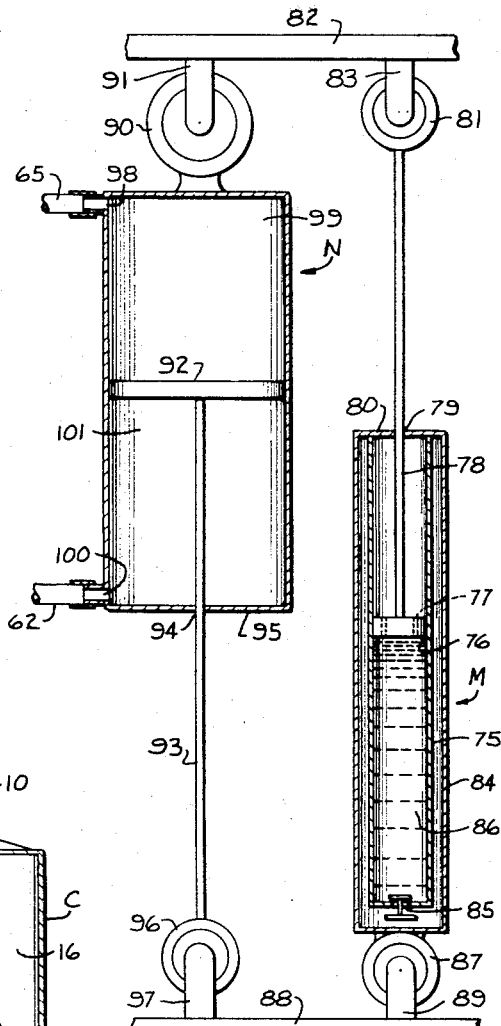

FIGURE 7 is a schematic showing of another modified form of my invention. The standard hydraulic shock absorber is shown separated from the two-way control air cylinder although both are operatively connected to two separately movable parts of a vehicle.

Detailed description

In carrying out my invention, I will first describe the shock absorber shown in FIGURES 1 and 2, and then will describe the mechanism for altering the effective lengths of two or more shock absorbers that are applied to a vehicle. The shock absorber is indicated generally at A and it comprises a hydraulic cylinder B in which a piston 1 is slidably disposed. This piston has bleed openings 2 therein and a piston rod 3 extends upwardly from the piston and is slidably received in an opening 4 provided in a disc 5 that has a larger diameter than the cylinder B. The opening 4 may be provided with an oil seal so as to prevent the fluid in the cylinder B from escaping through the opening.

The hydraulic cylinder B is enclosed in an outer cylinder 6 and the disc 5 closes the top of the outer cylinder. The bottom of the hydraulic cylinder B has an opening 7 that communicates with the outer cylinder 6 so that excess oil can flow from the hydraulic cylinder B into the outer cylinder that constitutes a reserve reservoir for the fluid. A valve 8 is provided for the opening 7 and has bleed passages therein, not shown, for permitting the slow flow of excess fluid from the hydraulic cylinder B to enter the outer cylinder 6. The valve 8 is so arranged that it will permit the ready flow of fluid from the outer cylinder 6 to enter the hydraulic cylinder B when this cylinder is able to receive this additional fluid. In actual practice the outer cylinder 6 has a capacity for receiving the excess fluid from the hydraulic cylinder B that is displaced by the entrance of the piston rod 3 into the hydraulic cylinder as the piston 1 moves downwardly therein.

The hydraulic shock absorber just described is of standard construction and I apply my control mechanism to this shock absorber for changing the effective length of the shock absorber for a purpose hereinafter described.

I mount an air cylinder C around the disc 5 and the periphery of the disc can be provided with a Teflon seal for making an air-tight fit between the disc and the cylindrical wall of the air cylinder C. The piston rod 3 extends to the closed end 9 of the air cylinder and a top ring 10 is connected to the piston rod and to a part of a vehicle, not shown.

The bottom 11 of the air cylinder C has an end 12 of a tubular diaphragm D secured thereto by a ring 12. The other end 13 of the diaphragm is folded inwardly on itself and is secured to the outer cylinder 6 by a ring 13a. The tubular diaphragm D acts as a flexible closure for the bottom of the cylinder C and will permit relative movement between the air cylinder C and the outer cylinder of the shock absorber A.

I provide an air opening 14 at the top of the air cylinder C and a second air opening 15 at the bottom of the same cylinder. If air is admitted through the top air opening 14 into an upper air compartment 16 in the air cylinder C and air is permitted to exhaust from a lower air compartment 17 in the cylinder C and pass through the air opening 15, then the disc 5 which will function as a piston will be moved downwardly in the air cylinder C and this movement will increase the effective length of the shock absorber A, see FIGURE 2. The opposite is true when air is admitted through the opening 15 into the lower compartment 17 of the air cylinder C and air is allowed to exhaust from the upper compartment 16 and flow out through the opening 14 in the cylinder C. This will move the disc 5 upwardly in the air cylinder C and will foreshorten the effective length between the rings 10 and 10a, see FIGURE 1. The ring 10a is integral with the lower end of the shock absorber A, see also FIGURE 2.

Before describing the entire combination of the various parts in the automatic antisway mechanism for vehicles, I will first describe a novel valve mechanism that is controlled by a pendulum and this valve mechanism will direct air under pressure to the desired shock absorber so as to alter the effective length of it. One or more shock absorbers are applied to each side of the vehicle, not shown, and when the vehicle is moving in a straight line the shock absorbers A will function in their usual manner. However, when the vehicle makes a turn to the right, for example, the shock absorbers on the right hand side of the vehicle will be foreshortened in their effective lengths while the shock absorbers on the left hand side of the vehicle will be elongated. The degree of shortening of the shock absorbers on the right hand side and the lengthening of those on the left hand side of the vehicle is determined by the speed of the vehicle as it makes a right hand turn. The opposite effect will take place when the vehicle takes a left hand turn. In this case the left hand shock absorbers will be shortened in their effective lengths and the right hand shock absorbers will be elongated in their effective lengths.

Figure 3:
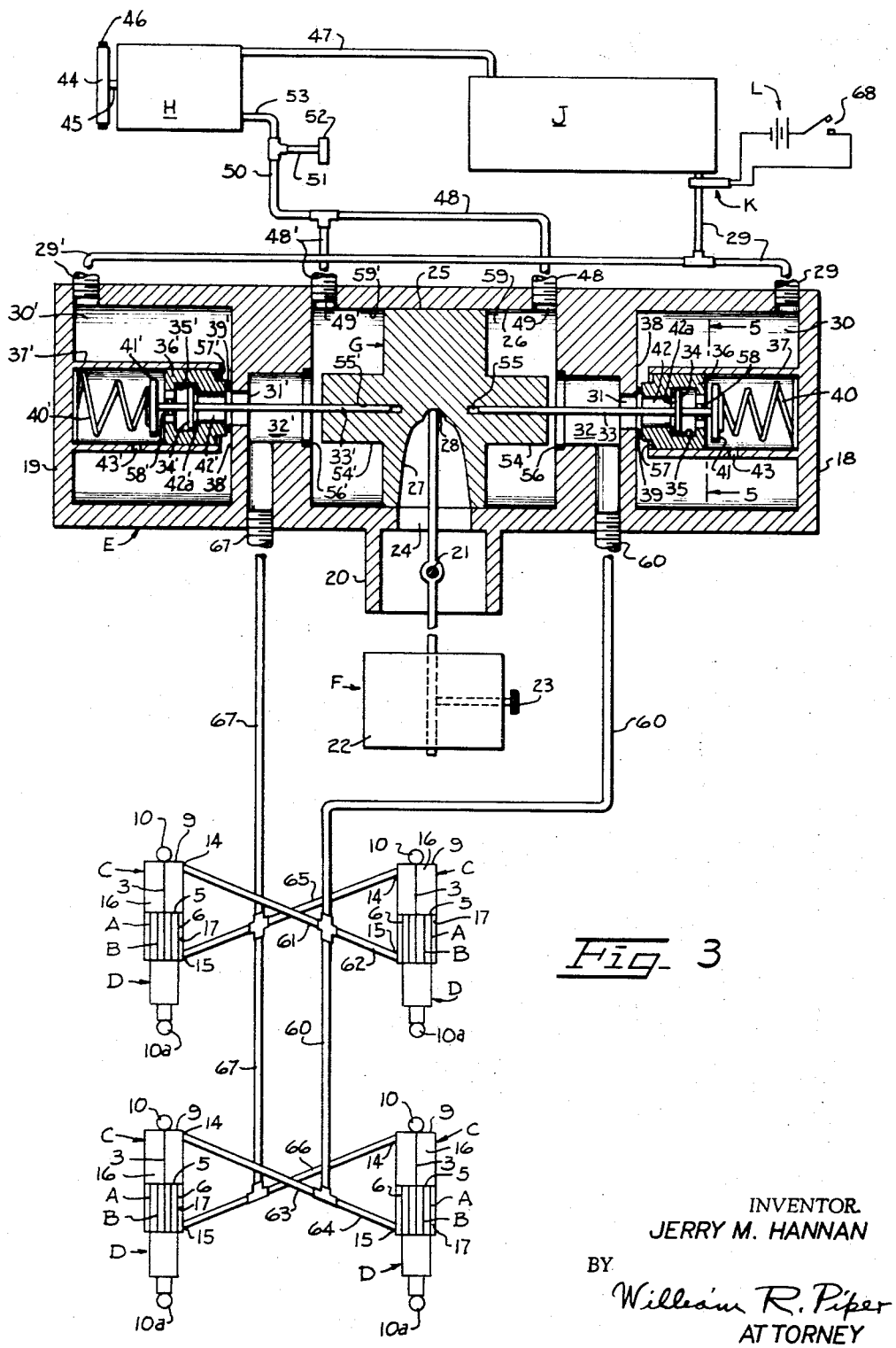
FIGURE 3 is a schematic view showing a plurality of my combined hydraulic shock absorbers and two-way control air cylinders coupled to an automatic pendulum-actuated control valve for banking the vehicle body in the right direction and at the proper angle as the vehicle makes a turn to the right or to the left.

The automatic valve for controlling the flow of air to the air cylinders C for the various shock absorbers to control them in the manner just mentioned, is shown in FIGURES 3 and 4. The valve comprises an outer cylindrical casing E that is closed at both ends 18 and 19. A depending cylindrical member 20 is integral with the casing E and is disposed midway between the ends of the casing. This cylindrical member 20 has a pivot pin 21 for pivotally supporting a pendulum indicated generally at F. The pendulum carries an adjustable weight 22 and a set screw 23 may be used for securing the weight 22 at the desired height on the pendulum shank. In actual practice the ends 18 and 19 would be removable from the casing E.

The portion of the pendulum shank extending above the pivot 21 is received in a slot 24 provided in the cylindrical casing E. A centrally disposed valve-actuating member G has a cylindrical outer surface 25 that is slidably received in a cylindrical bore 26 provided in the casing E. The valve-actuating member G has a recess 27 communicating with the slot 24 in the cylindrical casing E and this recess is provided with an inner pocket 28 for receiving the upper end of the pendulum shank. It will be seen from this construction that when the pendulum F swings in a clockwise direction about its pivot 21, see FIGURE 4, it will move the valve-actuating member G to the right and when the pendulum is swung in a counterclockwise direction, the valve-actuating member G will be moved to the left in the cylinder E. The pendulum is swung by centrifugal force as the vehicle turns to the right or to the left.

The automatic valve mechanism E is preferably placed at the front of the vehicle, not shown, and the longitudinal axis of the cylindrical casing E extends transversely to the length of the vehicle so that a lateral centrifugal force will be exerted on the weight 22 for swinging the pendulum F when the vehicle to which the automatic valve is attached turns to the right or to the left. When the vehicle is turned to the right the pendulum F will move the valve actuating-member G to actuate a valving mechanism that is disposed at the right hand end of the cylindrical casing E when looking at FIGURES 3 and 4. When the vehicle makes a turn to the left the pendulum F through its valve-actuating member G will actuate a similar valving mechanism at the left hand end of the cylindrical casing B. Therefore a description of the valving mechanism shown at the right hand end of the cylinder E will suffice for both mechanism and similar parts in the valving mechanism disposed at the left hand end of the cylinder E will have the reference numerals primed.

A compressed air inlet pipe 29, see FIGURE 3, communicates with a high pressure compartment 30 which is formed by the end 18 of the cylindrical casing E and by the adjacent cylindrical wall of the casing. The left hand end of the high pressure compartment 30 has a central opening 31 through which the compressed air in the compartment 30 can pass into an inner intermediate high pressure cylinder 32 when the central opening 31 is uncovered. A piston rod 33 extends through the opening 31 and the diameter of the rod is less than that of the opening so that air under pressure can pass through the opening when it is uncovered. The piston rod 33 actuates a pilot valve which comprises a valve disc 34 mounted on the piston rod and this disc is received in a compartment 35 formed in a pilot piston 36 that is slidably received in a control cylinder 37. The control 37 is axially aligned with the cylindrical casing E and has one end closed by the end 18 for the casing E and has its inner end spaced from the partition 38 in which the central opening 31 is provided.

The right hand side of the opening 31 in FIGURE 3 has a valve seat 39 and the left hand end of the piston 36 is normally held against the seat 39 for closing the opening 31. This is accomplished by means of a coil spring 40 that is disposed in the control cylinder 37 and this coil spring bears against the end 18 of the cylindrical casing E and also against a head 41 that is mounted on the right hand end of the piston rod 33. The spring 40 urges the head 41 to the left in FIGURE 3 and this will move the valve disc 34, mounted on the piston rod 33, to the left for causing the valve to close a central opening 42 in the piston 36. Also the disc 34 will hold the piston 36 against the valve seat 39 for closing the opening 31. Therefore the compressed air entering the pipe 29 will fill the high pressure compartment 30 with compressed air and will also flow into the control cylinder 37 through a bleed orifice 43 in the cylinder so that the air pressure within the control cylinder will eventually equal the air pressure in the compartment 30.

Before describing how the piston 36 operates to open the central orifice 31, it is best to set forth the source of compressed air pressure for the pipe 29. In FIGURE 3, I show an air compressor diagrammatically at H. This air compressor is of standard construction and is operated by a pulley 44 that is mounted on the air compressor shaft 45 and is rotated by a belt 46 when the engine of the vehicle, not shown, operates. An air pipe 47 leads from the air cylinder H to a high pressure air tank J. The high pressure air pipe 29 leads from the bottom of the air tank J to the right hand end of the cylindrical casing E and communicates with the compartment 30. A branch pipe 29' leads from the air pipe 29 and it communicates with the high pressure compartment 30' disposed at the other end 19 of the cylindrical casing E.

A pair of exhaust pipes 48 and 48' lead from exhaust ports 49 and 49' to a common exhaust pipe 50 and this has a branch pipe 51 communicating with the atmosphere through an air filter 52. The pipe 50 itself extends back to the inlet of the air compressor H through a section 53. By this arrangement if the air compressor needs atmospheric air it will draw this air through the air filter 52, the branch pipe 51 and the pipe section 53. Also the exhaust air flowing through the pipe 50 in a manner hereinafter described will feed back to the air compressor H if it is needed or it will exhaust to the atmosphere through the pipe section 51.

In this arrangement of parts it will be seen that as soon as the engine of the vehicle is started operating, the air compressor H will deliver compressed air to the tank J and the air compressor can be set for continuing to deliver air to the tank until the pressure in the tank equals one hundred and twenty-five pounds per square inch for example, or any other pressure desired. The pipe 29 will therefore convey air at this pressure from the tank J to the compartments 30 and 30' in the cylindrical casing E and the device will be ready to operate as soon as the vehicle turns to the right or to the left and causes the pendulum F to swing about its pivot 21 due to centrifugal force.

Assume that the vehicle is making a right hand turn so as to swing the pendulum F clockwise about its pivot and to move the valve actuating member G to the right in FIGURE 4. The central member G has an extension 54 at its right hand end and this extension has a central bore 55 for slidably receiving the left hand end of the piston rod 33. When the piston rod is in normal position, its left hand end will be spaced from the bottom of the bore 55 so there will be a lost motion of the actuating member G before the bottom of the bore 55 contacts with the piston rod 33. During this movement of the central member G, the cylindrical extension 54 will enter the intermediate cylinder 32 to close it. The open end of the cylinder 32 has an annular seal 56 that is contacted by the right hand end of the cylindrical extension 54 for closing the intermediate cylinder before the piston rod 33 is actuated for initially opening the valve disc 34.

As soon as the piston rod 33 opens the disc valve 34, the compressed air in the control cylinder 37 will immediately exhaust through the central opening 42 and pass on through the central opening 31 in the partition 38. The compressed air in the high pressure compartment 30 will not be able to enter the control cylinder 37 through the bleed hole 43 fast enough to equalize the air pressure in the control cylinder 37 with that in the high pressure compartment 30. The result will be that the air pressure in the control cylinder 37 will be less than that in the high pressure compartment 30 for a short time and this will cause the high pressure air in the compartment 30 to react against an annular shoulder 57 on the piston 36 to move the piston into the control cylinder 37 for clearing the valve seat 39 and permitting air to flow from the high pressure compartment 30 through the central opening 31 and into the intermediate cylinder 32 that is now closed by the cylindrical extension 54, see FIGURE 4.

Figure 5:
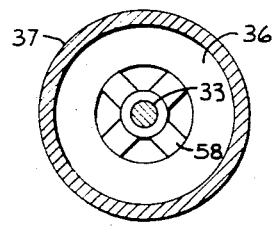
FIGURE 5 is an enlarged transverse section taken along the line 5—5 of FIGURE 3, and illustrates the spider that is carried by the pilot piston, the spider functioning as a central bearing for a control piston rod.

The piston 36 will remain unseated from the valve seat 39 so long as the vehicle is making a turn and there is sufficient centrifugal force to continue to hold the weight 22 to the left of the position shown in FIGURE 3, and to maintain the valve actuating member G in a position where the cylindrical portion 54 will keep the intermediate cylinder 32 closed as shown in FIGURE 4. The disc valve 34 will strike against a spider 58 that is formed at the right hand end of the piston 36, see FIGURES 4 and 5. The movement of the valve actuating member G by the pendulum F to the right in FIGURE 4, will cause the piston rod 33 to be moved to the right and bring the disc valve 34 into contact with the spider 58 for holding the piston 36 in open position until the valve actuating member G returns to normal position. The spider 58 can act as a centering bearing for the piston rod 33 and it will permit compressed air to flow into the compartment 35 in the piston 36 even though the disc valve 34 continues to contact with the inner surface of the spider.

Before describing the operation of the entire mechanism, it is best to state that after the vehicle has completed its turn and now continues in a straight forward direction, the weight 22 will return the pendulum F to neutral position and the pendulum in turn will move the valve-actutaing member G back to neutral position. This will cause the cylindrical portion 54 of the valve-actuating member G to open the inner end of the intermediate cylinder 32 and any compressed air in the cylinder will escape into an air outlet compartment 59 and this air can escape through the exhaust pipe 48 that communicates with this compartment and either flow out through the exhaust pipe 51 to the atmosphere or be returned to the air compressor H by means of the pipe section 53. The coil spring 40 is now free to move the piston rod head 41 to the left in FIGURE 4, and to move the piston rod 33 in the same direction so that the latter can move the disc valve 34 against its valve seat 42a for closing the central opening 42 in the piston 36 and for moving the piston to the left for closing the valve seat 39 in order to close the central opening 31. The valve mechanism is now ready for the next operation which will be caused by the swinging of the pendulum F when the vehicle negotiates the next turn in the road.

There is a novel construction in the mechanism just described which will cause compressed air to feed into the intermediate cylinder 32 so long as the pendulum F is swung by centrifugal force for moving the piston 36 into the control cylinder 37 for uncovering the central opening 31 and for keeping this opening uncovered.

Should the curve in the road be less pronounced for a portion of its length, the weight 22 will start to return the pendulum F toward neutral position and as soon as the cylindrical portion 54 of the valve actuating member G is moved by the pendulum so as to open the intermediate cylinder 32, the compressed air in the cylinder will feed into the air outlet compartment 59 rather than be conveyed to the shock absorbers in a manner hereinafter described. Of course the compressed air in the compartment 59 will then immediately flow into the exhaust pipe 48 and this will stop any further flow of compressed air from the intermediate cylinder 32 and into a conduit 60 that leads from the intermediate cylinder to the air compartment in the shock absorbers A.

If now the curve in the road should suddenly grow sharper, the weight 22 will again be moved to the left in FIG. 3, and will swing the pendulum F in a clockwise direction for moving the valve-actuating member G and causing the cylindrical portion 54 to again close the intermediate cylinder 32. The valving mechanism will operate in the manner already described and compressed air will flow from the pipe 29 through the mechanism and into the conduit 60.

It will also be seen that the device will bank the vehicle body to a greater extent for a sharper curve because the weight 22 will be moved further to the left in FIG. 4, and the valve actuating member G and the cylindrical operation 54 will be moved to the right for keeping the intermediate cylinder 32 closed for a longer length of time. During this time interval the compressed air from the pipe 29 will continue to flow in the conduit 60 and on into the air compartments for the shock absorbers for causing the left hand set of shock absorbers shown diagrammatically in FIG. 3, to be elongated to a greater extent and at the same time to cause the right hand group of shock absorbers to be reduced in their effective lengths. This will result in a steeper banking of the vehicle.

I have described the particular valve mechanism which will be actuated when the vehicle makes a right hand turn and the weight 22 is swung to the left as in FIG. 4. The opposite end of the cylindrical casing E will house a similar valve mechanism and when the vehicle makes a turn to the left, the weight 22 will be swung to the right with the result that the valve-actuating member G will be moved to the left and will actuate the left hand valve actuating mechanism in the same manner as already described for the valve mechanism for the right hand end of the casing E.

FIG. 3 shows the conduit 60 communicating with a branch pipe 61 that in turn communicates through the opening 14 with the upper compartment 16 of the air cylinder C for the left hand shock absorber A. The air entering the compartment 16 will lengthen the effective length of the shock absorber A, associated with this air compartment. The conduit 60 will also communicate with a second branch pipe 62 and this leads to the lower air compartment 17 by means of the opening 15 for enlarging this air compartment in the air cylinder C of the right hand side shock absorber A for decreasing the effective length of this shock absorber. These two shock absorbers will bank the vehicle body at a proper angle while the vehicle is making a right turn in the road.

If another pair of shock absorbers are used on the same vehicle as shown in FIG. 3, the conduit 60 will communicate with a second branch pipe 63 and this pipe will communicate with the upper air compartment 16 of the second left hand shock absorber A which will enlarge this compartment and will increase the effective length of the shock absorber in the same manner as already mentioned for the other shock absorber disposed on the left hand side of the vehicle. Furthermore the connection of the conduit 60 to another branch pipe 64 will convey compressed air to the lower air compartment 17 in the other right hand shock absorber A and this will shorten the effective length of this shock absorber in a manner already described.

It will further be seen from FIG. 3 that the upper air compartments 16 of the right hand shock absorbers A will be connected by conduits 65 and 66 to the lower compartments 17 of the left hand shock absorbers A. Both of the conduits 65 and 66 communicate with a conduit 67 that leads back to the intermediate cylinder 32′ in the left hand end of the casin E. When the vehicle is making a right hand turn the pendulum F will hold the valve actuating member G to the right in FIG. 4, so as to keep the cylindrical portion 54′ clear of the intermediate cylinder 32′. Therefore the air that is compressed in the lower air compartments 17 in the left hand shock absorbers A will exhaust through the conduits 65 and 66 and then enter the conduit 67 where the air will flow into the intermediate cylinder 32′ and into the air outlet compartment 59′. From here the exhaust air will flow into the exhaust pipe 48′ and then vent to the atmosphere through the pipe section 51.

When the vehicle makes a left hand turn the conduit 67 becomes a means for conveying compressed air to the upper air compartments 16 in the right hand shock absorbers A through the branch conduits 65 and 66 for elongating the effective lengths of the shock absorbers. At the same time compressed air will be admitted to the lower compartments 17 in the left hand shock absorbers A by means of the branch conduits 65 and 66 for decreasing their effective lengths. The exhaust air from the lower compartments 17 in the right hand shock absorbers A and from the upper compartment 16 in the left hand shock absorbers A will flow through the branch pipes 61 to 64, inclusive, to the conduit 60 which will convey the exhaust air back to the intermediate cylinder 32. This cylinder will be opened to the air outlet compartment 59 because the cylindrical portion 54 of the valve actuating member G has moved to the left in FIG. 3. The exhaust air will then flow through the exhaust pipe 48 to the branch pipe 51 and escape to the atmosphere.

It will be seen from this construction that the device will automatically bank the vehicle at the proper angle when the vehicle makes a turn and this angle will be automatically increased if the speed of the vehicle is increased or the turn becomes more sharp. When the vehicle is moving in a straight forward direction, the pendulum F will be in neutral position and then the shock absorbers A will function in their ordinary manner.

It is possible for the driver to make the device inoperative should he not wish to use it while driving the vehicle. I provide a solenoid actuated valve indicated generally at K and mount this valve in the line 29 that leads from the high pressure air tank J, see FIGURE 3. When the solenoid of this valve is de-energized, the valve will close and will stop the flow of compressed air through the pipe 29. Therefore the valving mechanism shown in the casing E will have no effect even though the pendulum F will actuate it during the movement of the vehicle around curves. This is true because the compressed air is not being fed through the valving mechanism.

When the driver wishes to have the device function, he closes an electric switch 68, see FIGURE 3, and this will close an electric circuit from the battery L of the vehicle to the solenoid in the solenoid valve K. The solenoid will be energized and will open the valve so that air can flow through the pipe 29 from the high pressure air tank J to the valve mechanism in the casing E in the manner already described.

It is possible to omit the lower air compartment 17 in each air cylinder C and use only the upper air compartment 16 for elongating the effective length of the shock absorber and to make use of gravity for shortening the effective length. For example in FIGURES 1 and 2, the lower air compartment 17 could be omitted and air entering the upper air compartment 16 would elongate the effective length of the shock absorber by moving the disc 5 toward the lower end of the air cylinder C. If the vehicle, not shown, were turning to the right, the left hand shock absorbers A, shown in FIGURE 3, would have their effective lengths elongated by admitting air to the upper compartments 16, and the effective lengths of the right hand shock absorbers A would be shortened by permitting air to exhaust from the upper compartments 16 as gravity causes the weight of the vehicle to press down upon the ring 10 to move the ring and cylinder end 9 toward the disc 5.

The stock absorbers A with single air compartments 16, could be actuated by the valve control mechanism E in the same manner as illustrated and described in FIGURES 3 and 4. The only change would be the elimination of the lower air compartments 17 and the air conduits communicating with them. Therefore further description of this feature need not be given.

In FIGURE 6, I show a slightly modified form of the shock absorber A, and associate air cylinder. In certain instances it is useful to be able to add additional compressed air to the upper air container 16 in order to support a heavier load in the vehicle. In this instance the pipe 14 that communicates with the compartment 16 would be connected to a shuttle valve P of standard construction. The branch pipe 61 would be connected to one inlet 125 of the shuttle valve P and another air pipe 126 would be connected to the other inlet 127 of the valve. The pipe 126 connects with a source Q of compressed air and a standard pressure regulator is placed in the pipe and is shown diagrammatically at R. The pressure regulator R can be adjusted from nothing up to the air pressure of the tank Q, say one hundred pounds. A T shown at 128 is placed in the pipe 126 and connects with a branch pipe 129 that leads to other shuttle valves, not shown, which in turn communicate with the upper air compartments 16 of other air cylinders of the shock absorbers.

The shuttle valve casing P has a movable valve plug 130, that is slidably mounted in the casing P. When the pressure regulator R is adjusted to zero pressure, the air cylinder C, in FIGURE 6, will operate in the same manner as that described for FIGURES 1 to 4 inclusive. The compressed air flowing through the pipe 61 will enter the shuttle valve casing P, and will move the valve plug 130 into the position shown in FIGURE 6 so that the air can enter the upper compartment 16 by way of the opening 14.

When the operator wishes to have the vehicle carry a heavier load, he adjusts the pressure regulator R to deliver a desired quantity of compressed air from the tank Q to the upper air compartment 16. The air in entering the shuttle valve casing P will move the valve plug 130 toward the inlet 125, and will place the inlet 127 in communication with the opening 14. If the operator sets the pressure of the pressure regulator R to say fifty pounds, the air will enter the upper air compartment 16 to build up a pressure of fifty pounds and will maintain this pressure automatically.

This air pressure in the upper air compartment 16 will not interfere with the automatic banking of the vehicle as it makes a right or left hand turn because if the effective length of the shock absorber A, shown in FIGURE 6, is to be lengthened, air will flow through the pipe 61 and will enter the shuttle valve casing P to move the valve plug 130 against the fifty pound air pressure already in the upper air compartment C. When this pressure is exceeded, the valve plug 130 will close the inlet 127, and will place the compartment opening 14 in communication with the conduit 61. The additional air entering the upper compartment 16 will elongate the effective length of the shock absorber A in the manner already described.

If two shock absorbers A with their air cylinders C are provided on each side of the vehicle with one set being disposed at the rear and the other set at the front of the vehicle, then the two rear shock absorbers could have their air cylinders C provided with shuttle valves P for connecting them to the auxiliary air pressure tank Q. It is possible to have the air cylinders of all four shock absorbers A provided with the shuttle valves P and connected to the tank Q. No additional description of the shuttle valves P and their operation is necessary.

In FIGURE 7, I show a modified form of my invention where I separate a standard shock absorber M from a two way air cylinder N. The shock absorber is similar to the shock absorber A and it has a hydraulic cylinder 75 in which a piston 76 is slidably mounted. This piston has bleed holes 77 therein and a piston rod 78 extends upwardly from the piston and passes through an opening 79 provided in the closed upper end 80 of the hydraulic cylinder. A connecting ring 81 is mounted at the upper end of the piston rod and is operatively connected to a moving part 82 of a motor vehicle, not shown. The connection may be made in any manner desired and I have shown a U-shaped member 83 that is connected to the member 82 and has a portion rockably received in the ring 81.

The hydraulic shock absorber M also has an outer cylinder 84 and the lower end of the hydraulic cylinder has a valve-controlled opening 85 that permits the excess fluid 86 in the hydraulic cylinder 75 to flow into the space between the cylinder 75 and the outer cylinder 84. This flow takes place when the piston rod 78 enters the hydraulic cylinder and displaces a certain amount of the fluid. When the piston rod moves in the opposite direction, the fluid in the reservoir surrounding the hydraulic cylinder 75 and contained in the outer cylinder 84 will reenter the hydraulic cylinder. A ring 87 is connected to the lower end of the outer cylinder 84 and the ring also is operatively connected to another moving part 88 of the vehicle by means of a U-shaped member 89. I have described a standard shock absorber which will permit relative movement of the two parts of the vehicle 82 and 88 to take place slowly because the fluid has to pass through the bleed holes 77 in the piston 76.

Instead of making the two-way acting air cylinder a part of the hydraulic shock absorber which is shown in FIGURES 1 and 2, I separate the air cylinder N from the hydraulic shock absorber M as clearly shown in FIGURE 6. The air cylinder N has a ring 90 connected thereto and the ring is also connected to the member 82 of the motor vehicle by a U-shaped member 91. The air cylinder N has a piston 92 slidably mounted therein and a piston rod 93 extends downwardly from the piston and is slidably received in an opening 94 provided in the lower end 95 of the air cylinder. A ring 96 is secured to the lower end of the piston rod and a U-shaped member 97 operatively connects the ring 96 to the movable vehicle part 88.

The air cylinder N has an opening 98 near the top of the cylinder for permitting air to enter and exhaust from an upper air compartment 99 in the air cylinder N. Also the lower end of the air cylinder N has an opening 100 and this opening permits air to enter and exhaust from a lower air compartment 101 that is disposed below the piston 92.

The two-way air cylinder N shown in FIGURE 6 will be provided for each side of the vehicle and preferably placed near the shock absorber on the same side. If there are two or more shock absorbers on each side of the vehicle, then there can be at least one two-way air cylinder on each side and preferably a two-way air cylinder is provided for each shock absorber.

The two-way air cylinder N is similar in operation to the two-way air cylinder C shown in FIGURES 1 and 2. The only difference is that the air cylinder C is formed as a part of the shock absorber A while the air cylinder N is shown separated from the standard shock absorber M but is preferably connected to the same two relatively movable parts 82 and 88 of the vehicle.

In FIGURE 3, I show four shock absorbers A, two being disposed on each side of the vehicle. These shock absorbers are connected to the air lines 60 and 67 that lead to the pendulum-actuated control valve mechanism. If the air cylinders N and the standard shock absorbers M were substituted for the combined shock absorbers A with their air cylinders C, then each two-way air cylinder N would have its port 98 connected to one of the air pipes such as the air pipe 67 through the branch pipe 65 and the other air port 100 that communicates with the lower air compartment 101 would be connected to the other air pipe 60 by the second branch pipe 62.

If only two of the two-way air cylinders N are used on the vehicle, these would be connected to the air pipes 60 and 67 shown in FIGURE 3 in exactly the same way as the upper pair of shock absorbers A shown in this figure have their air cylinders C connected to these pipes 60 and 67. If four shock absorbers M are used with two of these being placed on each side of the vehicle, then it is preferable to provide four air cylinders N, one for each shock absorber. These four air cylinders will be connected to the air pipes 60 and 67 in the same way as the four air cylinders C shown in FIGURE 3 are connected to the same pipes.

The operation of this form of the device is similar to the form shown in FIGURES 1 to 4, inclusive. Compressed air will be automatically fed to the air cylinders so as to bank the body of the vehicle in the right direction and at the proper angle as the vehicle takes a turn to the right or to the left. The upper air compartment 99 could have a shuttle valve P communicating therewith if additional compressed air is to be delivered to the compartment for supporting a heavier load. Also the lower air compartment 101 could be eliminated and only the air compartment 99 used for elongating the effective length of the shock absorber M, and gravity used for shortening the effective length of the shock absorber. The shuttle valves P can be mounted at a considerable distance from their associate air compartments if desired.

I claim:
1. In combination:
 (a) a first two-way air cylinder having one end with a nonresilient connection to a first part of a vehicle at one side of the vehicle;
 (b) a piston slidably mounted in said cylinder and dividing it into a first and a second air compartment;
 (c) a piston rod extending from said piston and being slidably received in the opposite end of said cylinder, the free end of said rod having a nonresilient connection with a second relatively movable part of the vehicle and on the same side thereof where the first-mentioned cylinder end is connected;
 (d) a second two-way air cylinder having an end with a nonresilient connection to the first part of the vehicle but on the opposite side thereof;
 (e) a second piston slidably mounted in said second cylinder and driving it into a first and a second air compartment;
 (f) a second piston rod extending from said second piston and being slidably received in the opposite end of said second cylinder, the free end of said second rod having a nonresilient connection with the second relatively movable part of the vehicle and on the same side where said second cylinder end is connected;
 (g) said first air compartment in each cylinder when receiving air causing its associate piston to move for increasing the combined effective length of the cylinder and piston rod, and said second air compartment in each cylinder when receiving air causing the piston to move for decreasing the combined effective length of the cylinder and piston rod;
 (h) a first air conduit interconnecting said first air compartment of said first two-way air cylinder with said second air compartment of said second two-way air cylinder and a second air conduit interconnecting said second air compartment of said first two-way air cylinder with said first air compartment of said second two-way air cylinder;
 (i) a source of compressed air; and
 (j) a valve operated by centrifugal force when the vehicle makes a turn in one direction for placing said first air conduit in communication with said compressed air source and said second air conduit in communication with the atmosphere for elongating the effective length of said first air cylinder and its piston rod and for decreasing the effective length of said second air cylinder and its piston rod for banking the vehicle at the proper angle for making the turn;
 (k) said valve being operated by centrifugal force when the vehicle makes a turn in the other direction for placing said second conduit in communication with said compressed air source and said first air conduit in communication with the atmosphere for elongating the effective length of said second air cylinder and its piston rod and for decreasing the effective length of said first air cylinder and its piston rod for banking the vehicle at the proper angle and in the opposite direction.

2. The combination as set forth in claim 1: and in which
 (a) a shock absorber is associated with said first two-way air cylinder and is connected to the same two parts of the vehicle so as to act as a snubber between the two relatively movable vehicle parts regardless of the effective length of the first two-way air cylinder and its piston rod; and
 (b) a second shock absorber is associated with said second two-way air cylinder and is connected to the same two vehicle parts to which said second air cylinder is connected so as to function as a snubber between the two relatively movable vehicle parts regardless of the effective length of said second two-way air cylinder and its piston rod.

3. The combination as set forth in claim 1: and in which
 (a) an auxiliary source of compressed air is provided;
 (b) pressure regulating means connecting said auxiliary source of compressed air with said first air compartments of both the first and second two-way air cylinders for simultaneous increasing the air pressure therein to the desired extent for causing said air cylinders and pistons to support heavier loads; and
 (c) air checking means associated with said air pressure regulating means for preventing any return air flow from both of said first air compartments back into said auxiliary source of compressed air.

4. In combination:
 (a) a first shock absorber mounted on one side of a vehicle and having nonresilient connections with two relatively movable parts of the vehicle, and a second shock absorber mounted on the other side of the vehicle and having nonresilient connections with the same two relatively movable parts of the vehicle;
 (b) an expandable air cylinder coupled to each shock absorber for increasing the effective length of said shock absorber when air is added thereto, one end of each air cylinder having a nonresilient connection with one part of the vehicle on each side thereof and an end of each shock absorber having a nonresilient connection with another relatively movable part of the vehicle on each side thereof;
 (c) a source of compressed air;
 (d) an air valve associated with the vehicle and operated by centrifugal force when the vehicle turns to the right or to the left;
 (e) a first air conduit leading from the compressed air source to said valve;

(f) a second air conduit leading from said valve to the air cylinder of said first shock absorber and a third air conduit leading from this air cylinder to the atmosphere and being controlled by said valve;

(g) a fourth air conduit leading from said valve to the air cylinder of said second shock absorber and a fifth air conduit leading from this air cylinder to the atmosphere and being controlled by said valve;

(h) said centrifugal valve being actuated when the vehicle turns in one direction for connecting said first conduit to said second conduit for enlarging the air cylinder and increasing the effective length of said first shock absorber and simultaneously connecting said fifth conduit to the atmosphere for exhausting air from the cylinder associated with said second shock absorber for decreasing the effective length thereof for banking the vehicle laterally in one direction and when the vehicle turns in the opposite direction for connecting said first conduit to said fourth conduit for enlarging the air cylinder and increasing the effective length of said second shock absorber and simultaneously connecting said third conduit to the atmosphere for exhausting air from the cylinder associated with said first shock absorber for decreasing the effective length thereof for banking the vehicle laterally in the opposite direction.

5. The combination as set forth in claim 4: and in which (a) an auxiliary source of compressed air is provided;

(b) pressure regulating means connecting said auxiliary source of compressed air with both expandable air cylinders for simultaneously increasing the air pressure therein to the desired extent for causing said air cylinders and associate shock absorbers to support heavier loads; and (c) air checking means associated with said air pressure regulating means for preventing any return air flow from both of said air cylinders back into said auxiliary source of compressed air.

References Cited
UNITED STATES PATENTS

| | | | |
|---|---|---|---|
| 2,338,897 | 1/1944 | Boulogne et al. | 267—11 |
| 2,743,941 | 5/1956 | Walker | 280—112.1 |
| 2,804,311 | 8/1957 | Pobanz | 280—112.1 |
| 3,122,379 | 2/1964 | Allinquant | 267—11 |

DRAYTON E. HOFFMAN, *Primary Examiner.*

U.S. Cl. X.R.

280—112